(12) United States Patent
Riesselmann (10) Patent No.: US 6,450,085 B1
(45) Date of Patent: Sep. 17, 2002

(54) APPARATUS FOR COOKING DISHES BY HEATING

(76) Inventor: Gottfried Riesselmann, Achtern Diek 34, D-49377 Vechta (DE)

( * ) Notice: Subject to any disclaimer, the term of this patent is extended or adjusted under 35 U.S.C. 154(b) by 0 days.

(21) Appl. No.: 09/463,046

(22) PCT Filed: Jul. 10, 1998

(86) PCT No.: PCT/EP98/04282

§ 371 (c)(1),
(2), (4) Date: Sep. 7, 2000

(87) PCT Pub. No.: WO99/04202

PCT Pub. Date: Jan. 28, 1999

(30) Foreign Application Priority Data

Jul. 18, 1997 (DE) .......................................... 197 30 829

(51) Int. Cl.[7] .......................... A47J 37/00; A47J 39/00; F24C 15/32
(52) U.S. Cl. .............................. 99/327; 99/330; 99/339; 99/340; 99/352; 99/400; 99/427; 99/446; 99/450; 99/476; 219/400; 219/401
(58) Field of Search ........................ 99/323.5, 325–333, 99/337, 338, 427, 339, 348, 340, 352–355, 357, 400, 401, 444–450, 467, 468, 476, 483, 419, 484, 443 C, 443 R, 421 H; 426/501, 512, 520, 523; 219/492, 389, 400, 401, 681, 757; 126/21 A, 21 R (56) References Cited

U.S. PATENT DOCUMENTS

| | | | |
|---|---|---|---|
| 3,658,047 A | | 4/1972 | Happel |
| 3,899,961 A | | 8/1975 | Tanguy |
| 4,378,729 A | | 4/1983 | Pierick |
| 4,471,750 A | | 9/1984 | Burtea |
| 5,001,971 A | | 3/1991 | Beller |
| 5,445,073 A | * | 8/1995 | Gilwood ...................... 99/427 |
| 5,545,874 A | | 8/1996 | Hansson |
| 5,579,681 A | * | 12/1996 | Ubert et al. .............. 99/330 X |
| 5,662,029 A | * | 9/1997 | Ubert et al. .............. 99/357 X |

FOREIGN PATENT DOCUMENTS

| | | |
|---|---|---|
| DE | 2727972 | 1/1979 |
| EP | 0612494 | 8/1994 |

* cited by examiner

Primary Examiner—Timothy F. Simone (57) ABSTRACT

Apparatus for cooking foods by heating with heat transmitted from outside to a product to be cooked by a current of hot air, wherein, substantially, a hot-air circuit is formed in an enclosed space and the product to be cooked rests on a receiving element (10) for the product to be cooked forming a receiving base (11), wherein air is flowable through the receiving base (11) of the receiving element (10) for the product to be cooked and the hot air is guided so that it flows through the product to be cooked substantially at right angles to the receiving base (11) of the receiving element (10) for the product to be cooked.

9 Claims, 7 Drawing Sheets

APPARATUS FOR COOKING DISHES BY HEATING

FIELD AND BACKGROUND OF THE INVENTION

The invention relates to an apparatus for cooking foods by heating with heat transmitted from outside to the product to be cooked by means of a current of hot air, wherein, substantially, a hot-air circuit is formed in an enclosed space and the product to be cooked rests on a receiving element for the product to be cooked forming a receiving base.

Hot-air ovens are known for the baking and cooking of foods, in which ovens a powerful fan forces the heated air into the baking space and circulates it approximately 40 to 50 times a minute. As a result of this circulation, the heat is transmitted rapidly, uniformly and intensively to the product to be roasted or baked. The disadvantage of such hot-air ovens is the fact that a relatively large amount of energy is necessary for cooking small quantities of foods by heating.

SUMMARY OF THE INVENTION

The object of the subject-matter of the invention is to form an apparatus of the generic type in such a manner that, in particular, small portions of foods can be heated in an energy-saving manner.

This object is initially and substantially with an apparatus, wherein air can flow through the receiving base of the receiving element for the product to be cooked and that the hot air is guided so that it flows through the product to be cooked substantially at right angles to the receiving base of the receiving element for the product to be cooked.

As a consequence of this, an apparatus of the introductory mentioned type is provided which is suitable, in particular, for the cooking of small portions of foods by heating. For example, deep-frozen portioned dishes can be placed on the receiving element for the product to be cooked, these portions corresponding to the amount for one or two servings. After the receiving element for the product to be cooked has been introduced into the apparatus, the hot-air is moved through the apparatus in a guided manner, and indeed in such a way that it flows through the product to be cooked substantially at right angles to the receiving base of the receiving element for the product to be cooked. In this arrangement, a screen-like formation of the receiving base is recommended. The result of this forced circulation of hot air is homogeneous heating of the product to be cooked. No zones of lower temperature remain after heating. The apparatus according to the invention can be used advantageously in restaurants, fast-food kitchens, snack bars, etc, where foods are to be dispensed in portions shortly after an order. For example, it is possible to combine a plurality of these apparatuses to form a larger unit, so that different foods can be heated in parallel. In detail, the flow of hot air through the apparatus is such that the hot air is passed in on one side of the receiving element for the product to be cooked and extracted on the other side. The introduction and extraction of the hot air takes place at the narrow sides of the receiving element for the product to be cooked, which receiving element has substantially a rectangular elongate outline, as a result of which the hot air flows optimally through the product to be cooked during its circulation. A further advantageous feature lies in the fact that the apparatus has an air-duct chamber and forms a chamber for the product to be cooked, which chambers extend with a mutual overlap. This results in a compact structural shape. Virtually the entire length of the air-duct chamber can be used to receive the chamber for the product to be cooked. It is advantageous for flow purposes, moreover, for the two chambers to be disposed concentrically to one another. The manner in which this is achieved is that the chamber for the product to be cooked is disposed inside the air-duct chamber. It is also advantageous in this respect that both chambers have the cross-sectional form of a circular cylinder. In conjunction with the mutually concentric disposal of the chambers, this offers the advantage of optimum hot air circulation. In order for the hot air coming from the air-duct chamber to be directed as intended to the front region of the product to be cooked, the chamber for the product to be cooked has an inlet slit starting from its outer wall, formed by an inward retraction and opening above the receiving element for the product to be cooked. This means that the hot air is directed into the zone below the receiving element for the product to be cooked and, from there, flows in the transverse direction through the receiving base of the receiving element for the product to be cooked. For handling purposes, it is advantageous if the support of the receiving element for the product to be cooked is disposed transversely to the longitudinal direction of it and forms the cover closing the chamber for the product to be cooked. In this way, the support performs a dual function. After passing through the product to be cooked, the hot air leaves the chamber for the product to be cooked via an air outlet in its rear wall which is disposed above the receiving element for the product to be cooked. Rail guidance for the receiving element for the product to be cooked ensures that the receiving element for the product to be cooked is securely fixed within the chamber for the product to be cooked. Consequently, the receiving element for the product to be cooked always assumes the intended position within the chamber for the product to be cooked. Provision is then made, according to the invention, for the fan generating the air flow to be disposed behind the rear wall of the chamber for the product to be cooked, the intake side being assigned to the air outlet and the delivery side to the air-duct chamber. For the purpose of heating the foods, heating elements are disposed in the air-duct chamber. It may be necessary on occasion to add moisture when heating foods. To this end, at least one water nozzle is provided to enrich the hot air with water or water vapour. Here again, the water nozzle is disposed within the air-duct chamber. The water nozzle may be aligned in such a way that the jet leaving it strikes the outer wall of the chamber for the product to be cooked. According to the invention then, an apparatus is provided for grilling, having a grill mounting rotatable about a horizontal grill-shaft for receiving a product to be grilled, in particular poultry, and having a heating surface lying above the grill-shaft, the heating surface being disposed coaxially with the grill-shaft and having a fat pan disposed below it. Economical use of energy is achieved by the fact that the fat pan forms a double bottom with a drainage aperture from the first bottom to the second bottom disposed below it. The fat dripping onto the first bottom cannot therefore solidify on the latter, and catch fire there, leaving combustion residues which reduce the heat-radiation effect of the fat pan. Instead, the dripping fat passes through the overflow from the first bottom to the second bottom disposed below it. For an apparatus of this type, reference is made to WO 96/03681. The content of this international application is hereby incorporated in full in the disclosure of the present invention, also in order to include features of this application in claims for the present invention. In order to minimize the period for which the fat remains on the first bottom, the latter is designed to decline toward the drainage aperture. For this purpose, it is particularly recommended that the first bottom should be formed in the manner of a gutter. By simple production engineering techniques, the gutter is formed by two substantially flat surfaced sections disposed at an obtuse angle to one another. A further provision is that a grill-grid is disposed above the bottom. The apparatus can thus also be used to grill a product for grilling lying on the grill-grid. A further energy-saving measure is the fact that the grilling apparatus forms additional lateral reflectors, the undersides of which adjoin cheeks of the fat pan. When grilling, for example, poultry, the latter is therefore largely surrounded by reflectors, as a result of which grilling times can be reduced not insignificantly.

BRIEF DESCRIPTION OF THE DRAWINGS

Two examples of embodiments of the invention are explained below, with reference to the figures of the drawings, in which.

DETAILED DESCRIPTION OF THE PREFERRED EMBODIMENT

Figure 1:
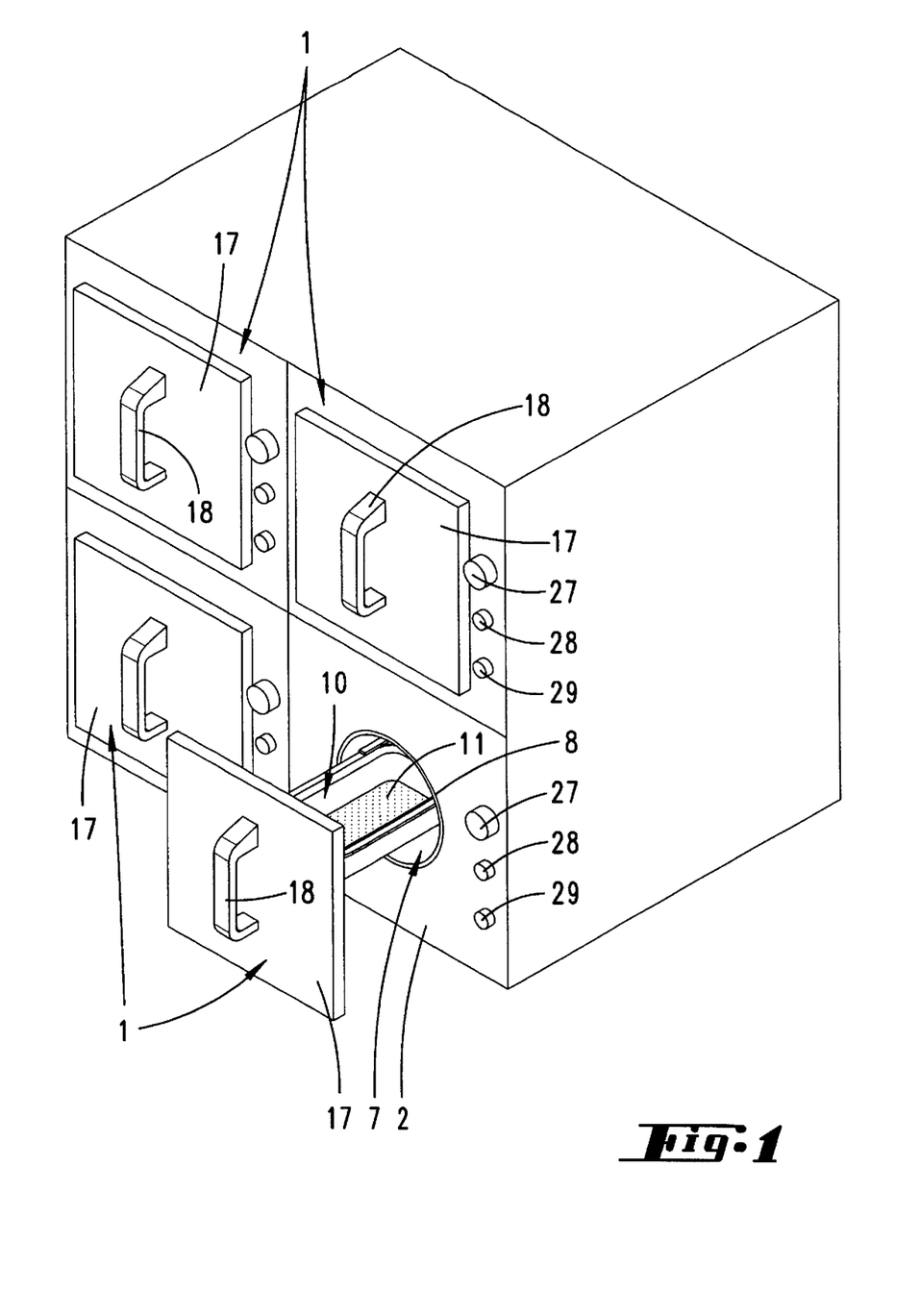
FIG. 1 shows a perspective view of a plurality of apparatuses for cooking foods by heating combined to form a unit, one chamber for product to be cooked being partially withdrawn, concerning the first embodiment.
Figure 2:
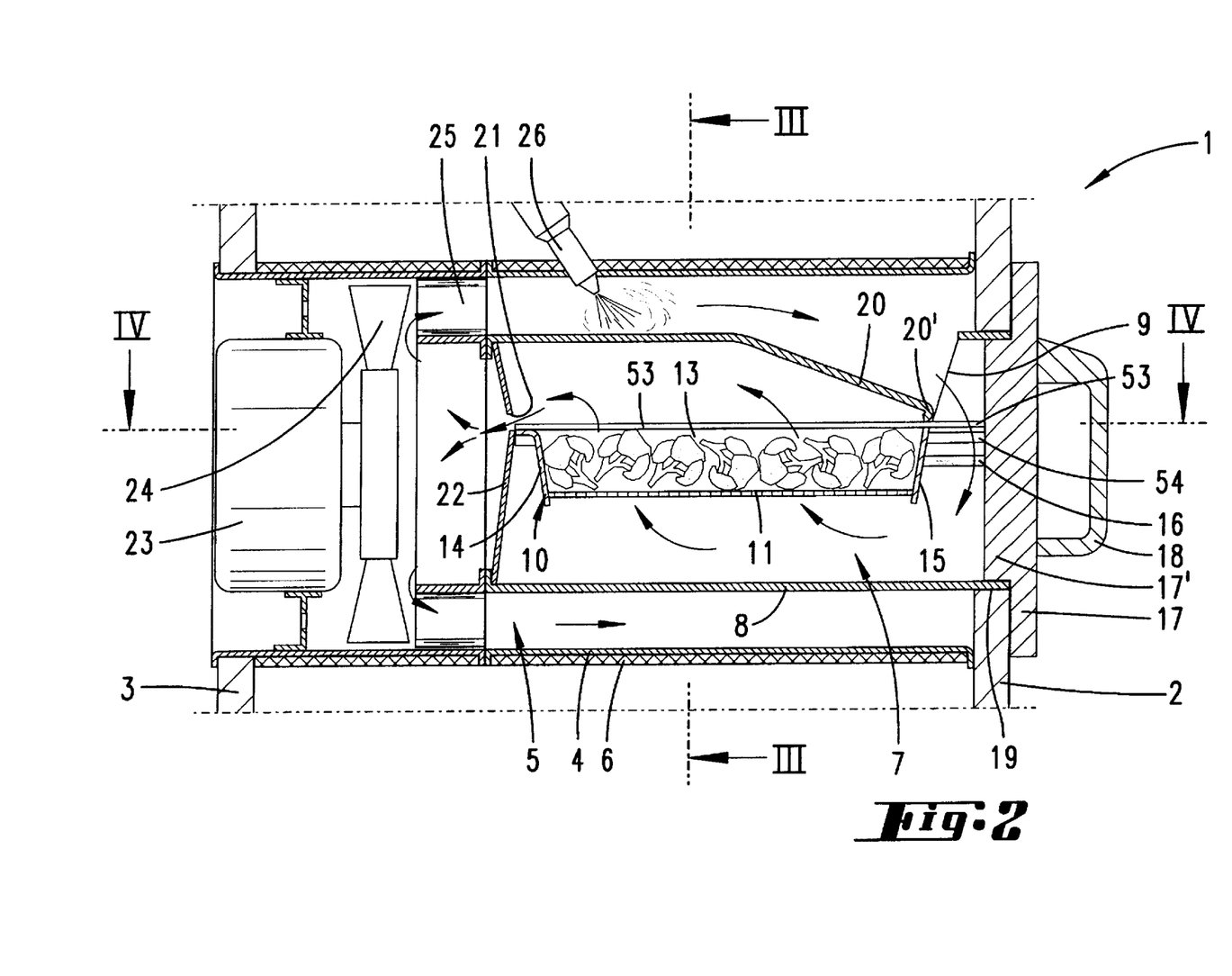
FIG. 2 shows a longitudinal section through an apparatus.
Figure 3:
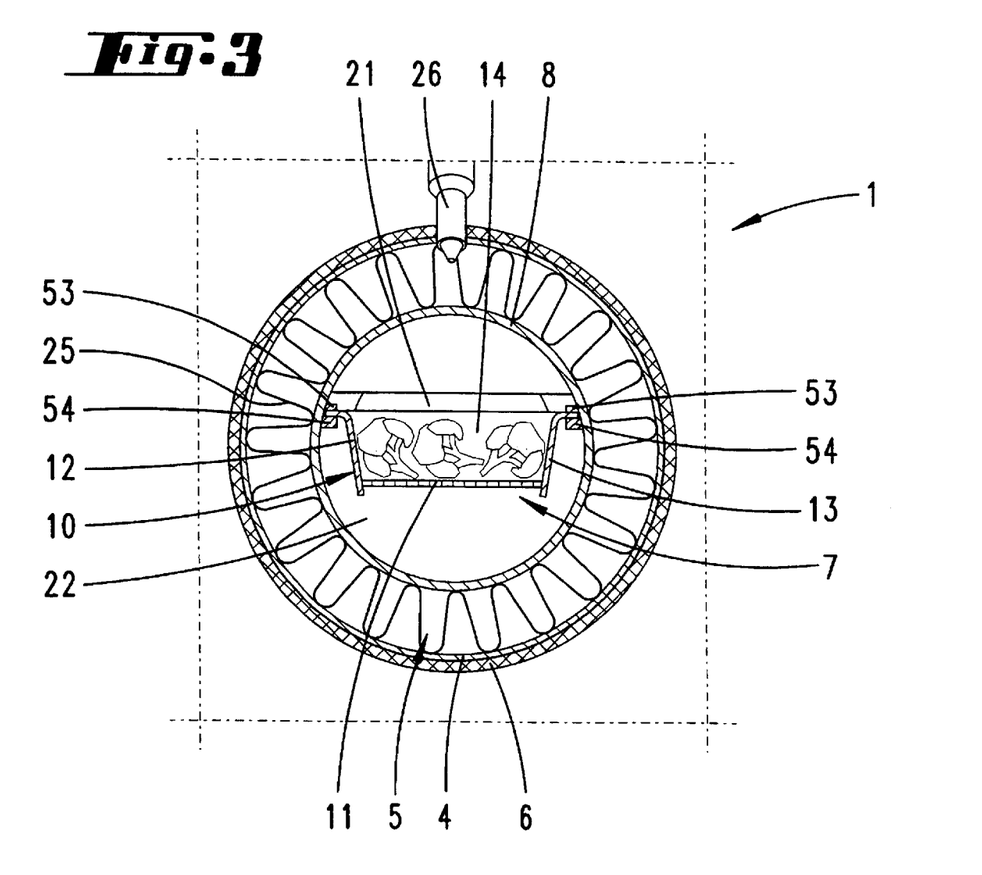
FIG. 3 shows the section along the line III—III in FIG. 2.
Figure 4:
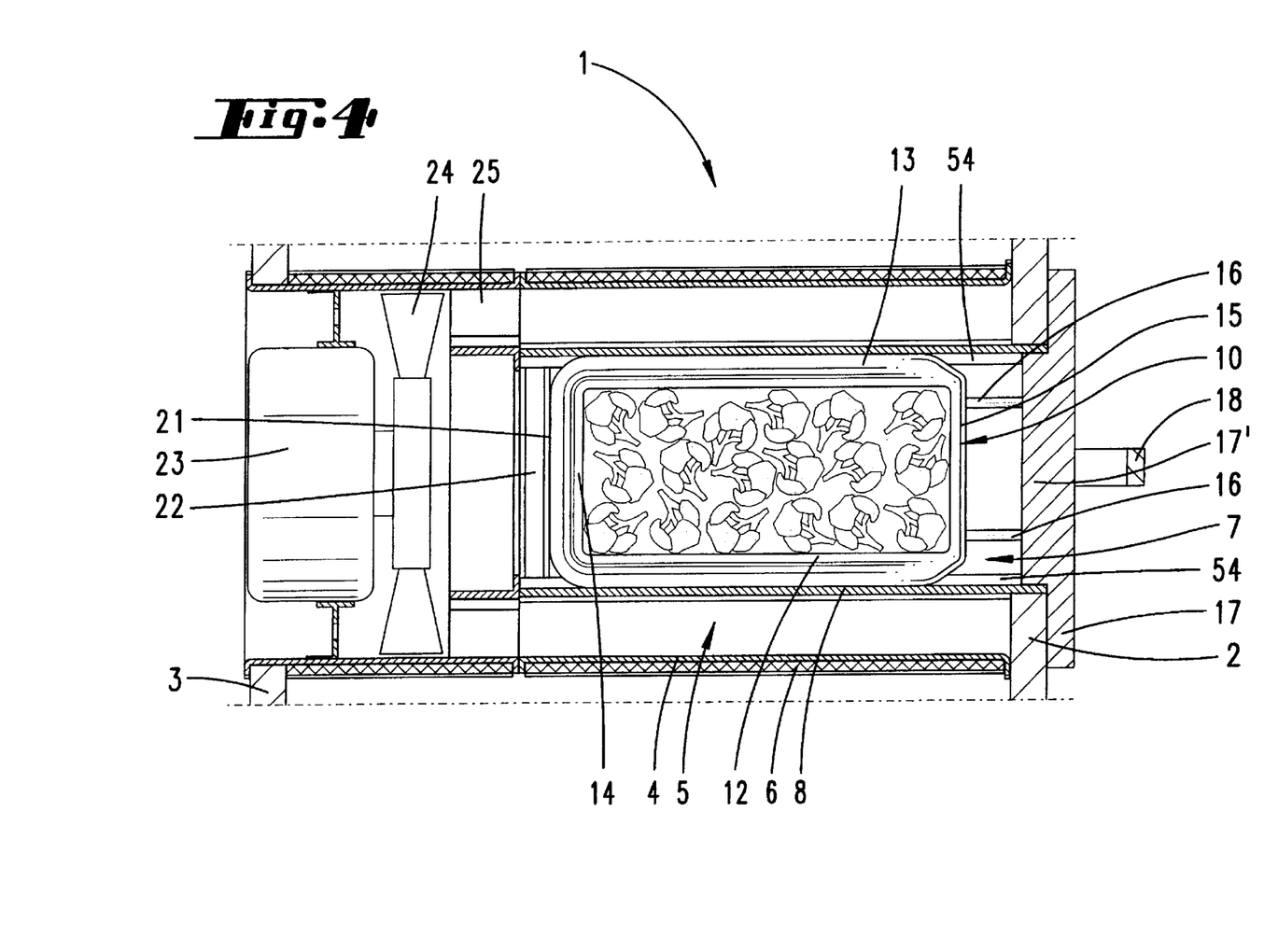
FIG. 4 shows the section along the line IV—IV in FIG. 2.

In accordance with the first embodiment, shown in FIGS. 1 to 4, four individual apparatuses 1 are combined to form a unit. Each apparatus 1 possesses a front plate 2 and a rear wall 3, which support a tubular shell 4 of an air-duct chamber 5. On the outside, the tubular shell 4 is surrounded by an insulating layer 6. Furthermore, the apparatus 1 possesses a chamber 7 for the product to be cooked, which two chambers 5, 7 extend with a mutual overlap. The two chambers 5, 7 are disposed concentrically to one another, so that the chamber 7 for the product to be cooked is arranged inside the air-duct chamber 5. The chamber 7 for the product to be cooked is formed by a cylindrical shell forming an outer wall 8. As illustrated in FIG. 3 in particular, the two chambers 5, 7 have the cross-sectional form of a circular cylinder. The chamber 7 for the product to be cooked has an inlet slit 9 extending from its outer wall 8, formed by an inward retraction 20 and opening above a receiving element 10 for the product to be cooked. As far as the latter is concerned, it is a container of rectangular elongate outline having a receiving base 11 formed in the manner of a screen from which the container side walls 12 to 15 extend. The longitudinally extending container side walls 12 and 13 of the receiving element 10 for the product to be cooked are guided by rails 53 and 54 extending in the longitudinal direction inside the outer wall 8. Two pegs 16 extending parallel, extending from a container side wall 15 on the narrow side, connect the receiving element 10 for the product to be cooked with a support 17. This is disposed transversely to the longitudinal direction of the chamber 7 for the product to be cooked and represents a lid closing the chamber 7 for the product to be cooked, for which purpose the support 17 forms an extension 17' in the form of a circular cylinder which extends into the end of the chamber 7 for the product to be cooked adjoining the inlet slit 9 so as to fill its shape. The support 17 is equipped with a gripping handle 18 in order to be able to remove the receiving element 10 for the product to be cooked from the chamber 7 for the product to be cooked via the pegs 16 and guided on rails. The push-in end of the chamber 7 for the product to be cooked is received by an aperture 19 in the front plate 2.

In the pushed-in position of the receiving element 10 for the product to be cooked, the retraction 20 forming the inlet slit 9 extends with its free end 20' to the top of the front side wall 15 of the container, see FIG. 2. This means that the inlet slit 9 opens above the receiving element 10 for the product to be cooked.

Furthermore, the chamber 10 for the product to be cooked is equipped with an air outlet 21 in the rear wall which is formed horizontally in a rear wall 22 of the chamber 7 for the product to be cooked. Behind this rear wall 22, a fan 23 having an impeller wheel 24 is disposed within the end of the air-duct chamber 5. The intake side of the fan is assigned to the air outlet 21 and the delivery side to the air-duct chamber 5. In order to generate a current of hot air, insulated electrical heating elements 25 are disposed behind the impeller wheel 24 in the air-duct chamber 5. Adjoining the heating element 25, the air-duct chamber 5 accommodates at least one water nozzle 26 to enrich the air with water or water vapour. The water nozzle 26 opening within the air-duct chamber 5 strikes with its jet upon the outer wall 8 of the chamber 7 for the product to be cooked.

Next, control knobs 27, 28 and 29 are arranged on each apparatus 1 to enable these to be used to turn on the apparatus and set the temperature and time, this being done as a function of the respective food to be heated.

The mode of action is as follows: the portion-wise heating of foods requires the receiving element 10 for the product to be cooked to be pulled out by means of the gripping handle 18. It is possible for the receiving element 10 for the product to be cooked to be pulled out completely or only to the largest part. The product to be cooked by heating is to be laid in the receiving element for the product to be cooked, which is open at the top. This product can, for example, also be deep-frozen. In the exemplary of embodiment, the product to be cooked comprises cauliflower pieces. When the receiving element 10 for the product to be cooked is filled, it is pushed completely into the chamber 7 for the product to be cooked, see FIG. 2. After setting the appropriate temperature and cooking period, the apparatus is switched on. A current of hot air is generated by the impeller wheel 24 of the fan 23 in the direction of the arrow, water optionally being added through the water nozzle 26. The hot air passes through the inlet slit 9 into the region below the receiving element 10 for the product to be cooked. The hot air, passed in under pressure, passes through the screen-like receiving base 11 and flows through the product to be cooked substantially at right angles to the base 11. Subsequently, the air which has previously heated the product to be cooked passes through the air outlet 21 and accordingly arrives in the region of the intake side of the fan 23, to be returned by the impeller wheel 24 into the air-duct chamber 5. After the product to be cooked has been heated and the fan turned off, the receiving element 10 for the product to be cooked can—optionally after a certain cool-down phase—be withdrawn by means of the handle 18.

With a plurality of apparatuses arranged in parallel, different foods can be cooked simultaneously by heating, so that one or more foods can be completed at short notice.

According to the second exemplary embodiment, illustrated in FIGS. 5 to 9, an apparatus for grilling is designated with the reference numeral 30. This apparatus possesses a housing 32 which can be closed by means of a front door 31 and has a grilling area G disposed centrally therein. The housing 32 also has a switch panel 33 with operating and display elements 35 for the grill area G.

Figure 5:
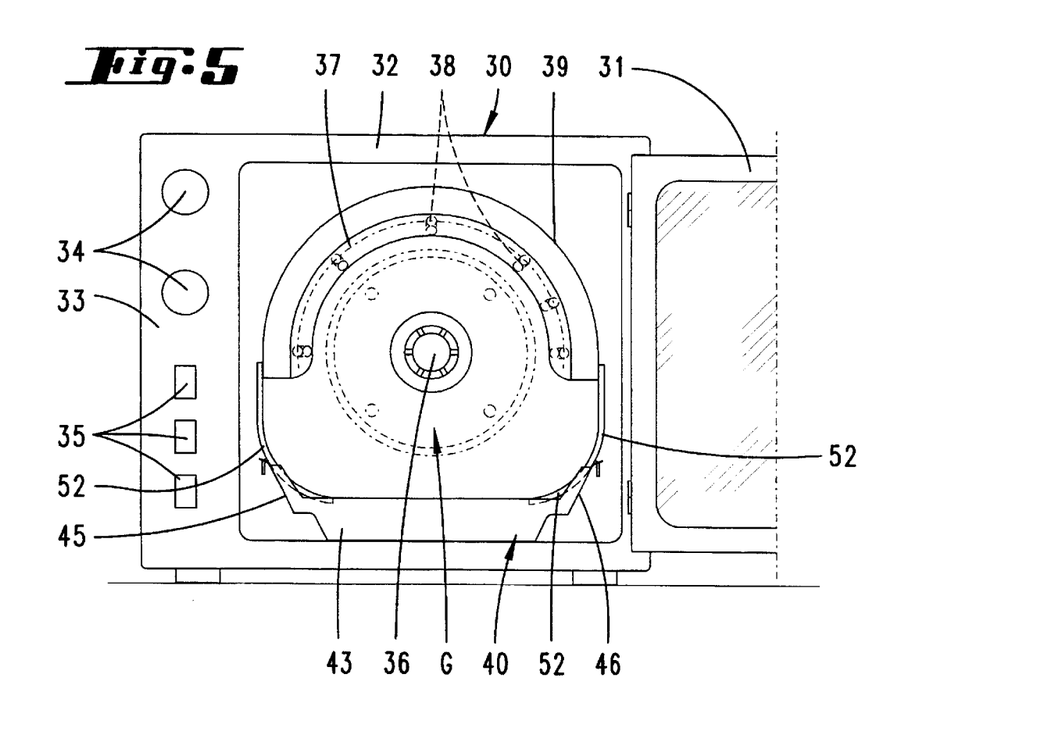
FIG. 5 shows an apparatus for grilling formed in accordance with the invention with the apparatus door opened showing a view of the end face of the fat pan.

The grill area G possesses a horizontal grill-shaft 36 for receiving a grilling-shaft (not shown). A heating surface 37 with individual heating elements 38, which can preferably be inductively heated, extends coaxially and concentrically with the grill-shaft 36. A reflector 39 is disposed above the heating surface 37.

Below the grilling area G, the housing 32 accommodates a fat pan 40. The latter possesses a substantially rectangular, elongate outline with a double bottom D. This is composed of a first bottom 41 with a second bottom 42 arranged below it. The sizes of the first bottom 41 and second bottom 42 are substantially the same. Integral upward-extending end walls 43, 44 and longitudinally extending, downward-angled side walls 44, 45 extend from the second bottom 42, between which walls 43 to 46 the first bottom 41 is inserted. Supporting wall sections 47 are angled downwards from the first bottom 41 at the long sides and become increasingly narrow towards a drainage aperture 48 beside the end wall. This means that the first bottom 41, resting on the second bottom 42, is formed to decline towards the drainage aperture 48. Besides, the first bottom 41 is formed in the manner of a gutter. The gutter 49 is formed by two sections A and B disposed at an obtuse angle and having substantially flat surfaces.

Figure 6:
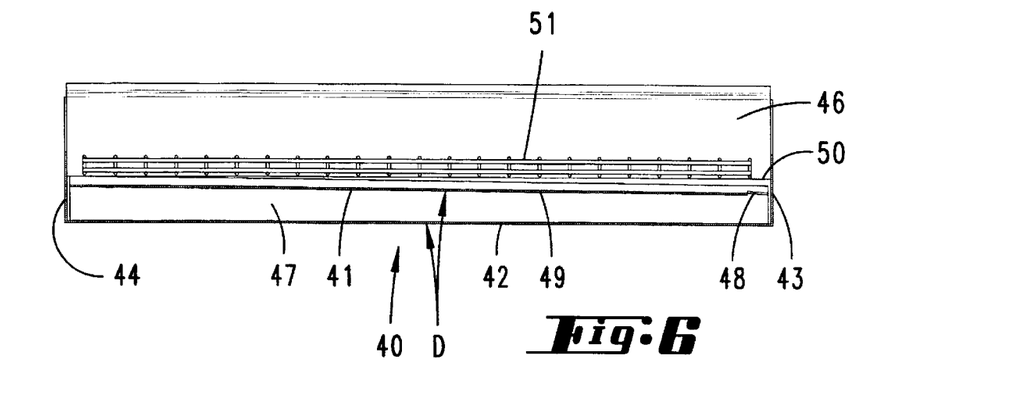
FIG. 6 shows a longitudinal section through the fat pan, forming a double bottom, with a grill-grid laid thereon.
Figure 7:
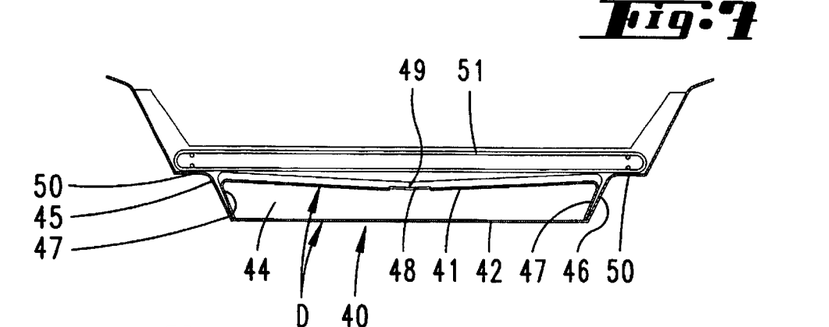
FIG. 7 shows a cross section through the fat pan.
Figure 8:
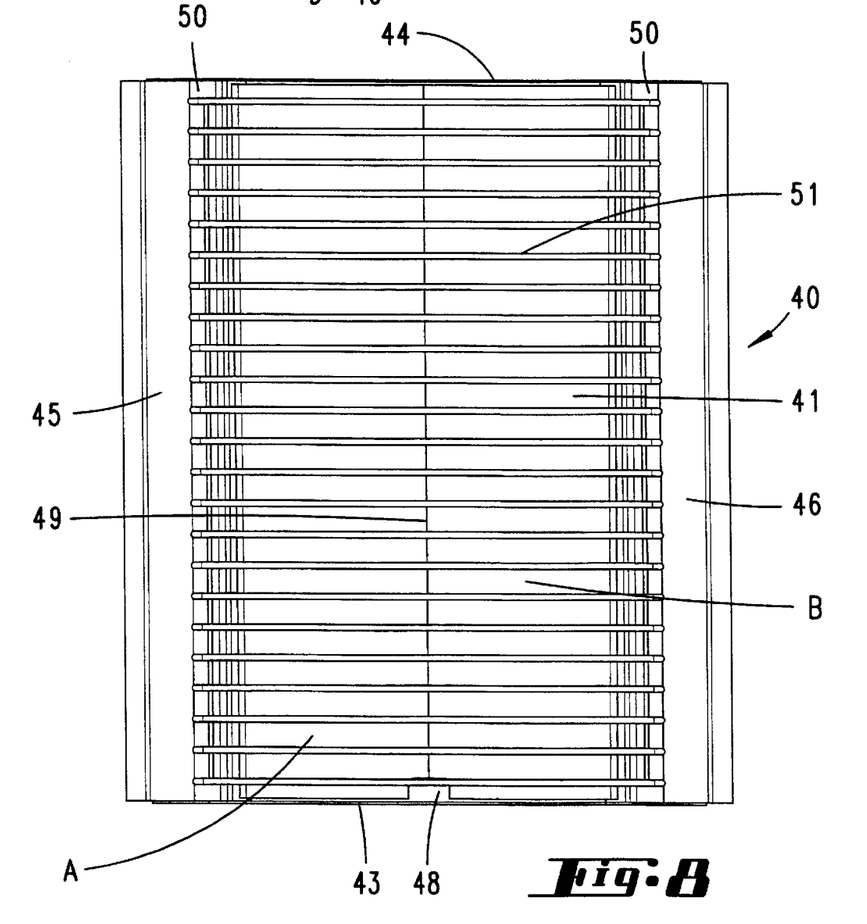
FIG. 8 shows a plan view of the fat pan and FIG. 9 shows a perspective view of the fat pan with the first bottom removed and a grill-grid arranged above it.
Figure 9:
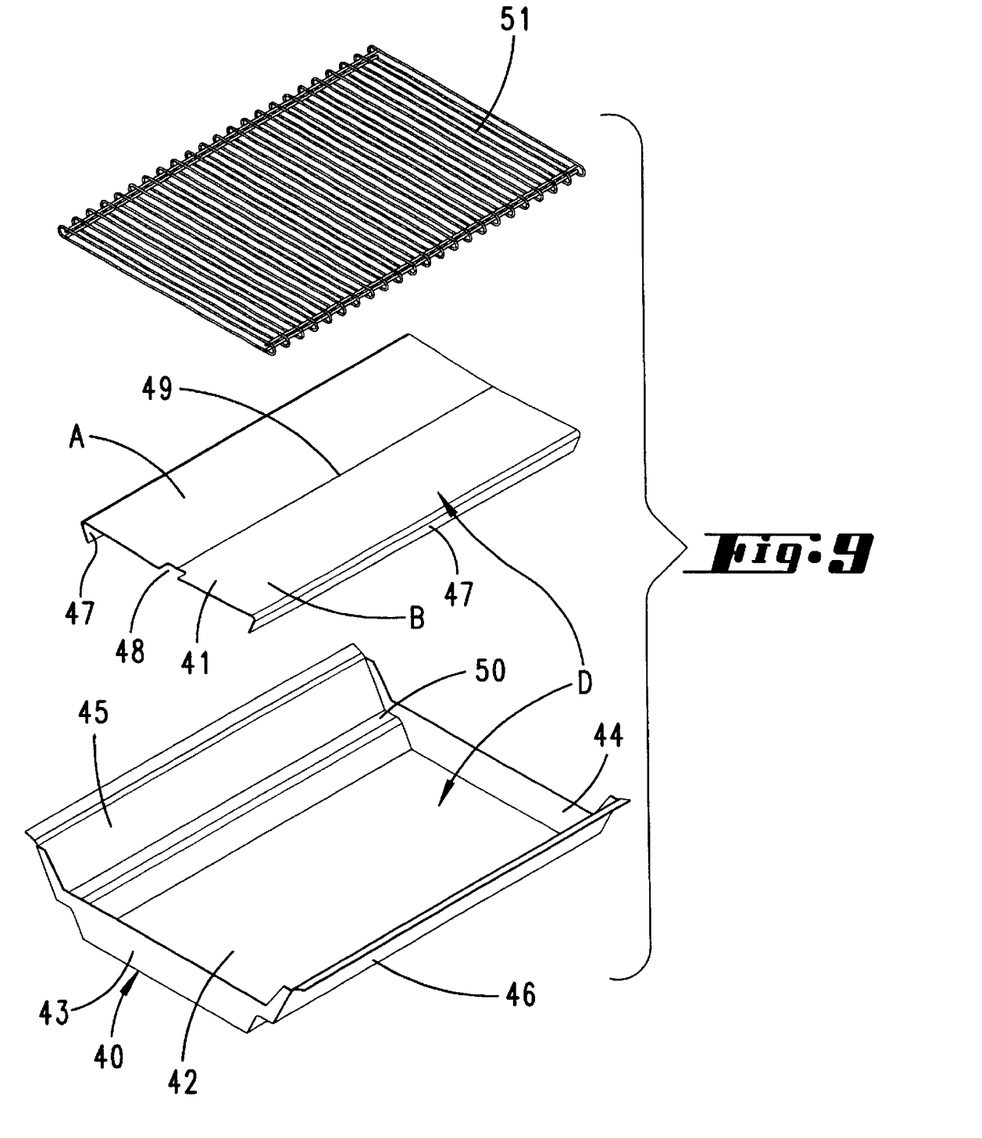

With the first bottom 41 inserted, this extends close below resting sections 50 of the side walls 45, 46. These resting sections 50 are used to accommodate a grill-grid 51 above the first bottom 41.

With the first bottom 41 inserted, fat dripping from the product to be grilled arrives on this bottom. As a result of the sections A and B at an obtuse angle to one another and of the descending course towards the drainage aperture 48, the fat flows through the drainage aperture 48 onto the second bottom 42 of the double bottom D and remains there, so that no combustion residues of draining fat can form on the first bottom 41, together with the fact that better use is made of the radiant heat.

FIG. 5 shows that the grilling apparatus 30 additionally forms lateral reflectors 52, whose lower ends adjoin cheeks formed by the side walls 45, 46. The radiation is better reflected by these towards the product to be grilled, so that the grilling times can be reduced not insignificantly. These additional reflectors can be plug-fitted or screwed to the cheeks of the side walls 45, 46.

What is claimed is:

1. Apparatus for cooking foods by heating with heat transmitted from outside to a product to be cooked by a current of hot air, wherein, substantially, a hot-air circuit is formed in an enclosed space and the product to be cooked rests on a receiving element (10) for the product to be cooked forming a receiving base (11), wherein air is flowable through the receiving base (11) of the receiving element (10) for the product to be cooked and the hot air is guided so that it flows through the product to be cooked substantially at right angles to the receiving base (11) of the receiving element (10) for the product to be cooked, wherein introduction and extraction take place at narrow sides of the receiving element (10) for the product to be cooked, and said receiving element has substantially a rectangular elongate outline.

2. Apparatus for cooking foods by heating with heat transmitted from outside to a product to be cooked by a current of hot air, wherein, substantially, a hot-air circuit is formed in an enclosed space and the product to be cooked rests on a receiving element (10) for the product to be cooked forming a receiving base (11), wherein air is flowable through the receiving base (11) of the receiving element (10) for the product to be cooked and the hot air is guided so that it flows through the product to be cooked substantially at right angles to the receiving base (11) of the receiving element (10) for the product to be cooked, wherein the apparatus (1) has an air-duct chamber (5) and forms a chamber (7) for the product to be cooked, said chambers extend with a mutual overlap, wherein both said chambers (5, 7) have the cross-sectional form of a circular cylinder, and wherein a support (17) for the receiving element (10) for the product to be cooked is disposed transversely to longitudinal direction and forms a cover closing the chamber (7) for the product to be cooked.

3. Apparatus for cooking foods by heating with heat transmitted from outside to a product to be cooked by a current of hot air, wherein, substantially, a hot-air circuit is formed in an enclosed space and the product to be cooked rests on a receiving element (10) for the product to be cooked forming a receiving base (11), wherein air is flowable through the receiving base (11) of the receiving element (10) for the product to be cooked and the hot air is guided so that it flows through the product to be cooked substantially at right angles to the receiving base (11) of the receiving element (10) for the product to be cooked, wherein the apparatus (1) has an air-duct chamber (5) and forms a chamber (7) for the product to be cooked, said chambers extend with a mutual overlap, wherein the chamber (7) for the product to be cooked has an air outlet (21) in its rear wall which is disposed above the receiving element (10) for the product to be cooked.

4. Apparatus for cooking foods by heating with heat transmitted from outside to a product to be cooked by a current of hot air, wherein, substantially, a hot-air circuit is formed in an enclosed space and the product to be cooked rests on a receiving element (10) for the product to be cooked forming a receiving base (11), wherein air is flowable through the receiving base (11) of the receiving element (10) for the product to be cooked and the hot air is guided so that it flows through the product to be cooked substantially at right angles to the receiving base (11) of the receiving element (10) for the product to be cooked, wherein the apparatus (1) has an air-duct chamber (5) and forms a chamber (7) for the product to be cooked, said chambers extend with a mutual overlap, the apparatus further comprising a fan (23), wherein the fan (23) generates the air flow and is disposed behind a rear wall (22) of the chamber (7) for the product to be cooked, an intake side being assigned to an air outlet (21) and a delivery side to the air-duct chamber (5).

5. Apparatus for cooking foods by heating with heat transmitted from outside to a product to be cooked by a current of hot air, wherein, substantially, a hot-air circuit is formed in an enclosed space and the product to be cooked rests on a receiving element (10) for the product to be cooked forming a receiving base (11), wherein air is flowable through the receiving base (11) of the receiving element (10) for the product to be cooked and the hot air is guided so that it flows through the product to be cooked substantially at right angles to the receiving base (11) of the receiving element (10) for the product to be cooked, wherein the apparatus (1) has an air-duct chamber (5) and forms a chamber (7) for the product to be cooked, said chambers extend with a mutual overlap, and wherein at least one water nozzle (26) is provided to enrich the air with water or water vapour.

6. Apparatus according to claim 5, wherein the water nozzle (26) opens within the air-duct chamber (5).

7. Apparatus according to claim 6, wherein the water nozzle (26) strikes upon an outer wall (8) of the chamber (7) for the product to be cooked.

8. Apparatus for grilling, comprising a grill mounting rotatable about a horizontal grill-shaft (36) for receiving a product to be grilled, in particular poultry, and having a heating surface (37) lying above the grill-shaft (36), the heating surface being disposed coaxially with the grill-shaft and having a fat pan (40) disposed therebelow, and wherein the fat pan (40) forms a double bottom (D) with a drainage aperture (48) from a first bottom (41) to a second bottom (42) disposed therebelow, the apparatus further comprising a grill-grid (51) disposed above the first bottom (41).

9. Apparatus for grilling, comprising a grill mounting rotatable about a horizontal grill-shaft (36) for receiving a product to be grilled, in particular poultry, and having a heating surface (37) lying above the grill-shaft (36), the heating surface being disposed coaxially with the grill-shaft and having a fat pan (40) disposed therebelow, and wherein the fat pan (40) forms a double bottom (D) with a drainage aperture (48) from a first bottom (41) to a second bottom (42) disposed therebelow, wherein the grilling apparatus (30) forms additional lateral reflectors (52), undersides of which adjoin cheeks of the fat pan (40).

* * * * *